United States Patent [19]
Albers

[11] Patent Number: 4,605,309
[45] Date of Patent: Aug. 12, 1986

[54] MIXING AND SHEARING ROLLER-MILL

[75] Inventor: August Albers, Heitersheim, Fed. Rep. of Germany

[73] Assignee: Hermann Berstorff Maschinenbau GmbH, Hanover, Fed. Rep. of Germany

[21] Appl. No.: 690,052

[22] Filed: Jan. 9, 1985

[30] Foreign Application Priority Data

Jan. 16, 1984 [EP] European Pat. Off. ........ 84100370.0

[51] Int. Cl.⁴ ................................................ B29B 1/06
[52] U.S. Cl. ........................................ 366/76; 366/77; 366/85; 366/300; 366/301; 425/366
[58] Field of Search ............... 366/72, 73, 74, 75, 366/76, 77, 83, 85, 97, 297, 298, 299, 300, 301; 425/366, 200, 201, 204, 208

[56] References Cited

U.S. PATENT DOCUMENTS

| 827,936 | 8/1906 | Obermaier | 366/73 |
| 4,025,058 | 5/1977 | Mizuguchi | 366/77 |
| 4,047,705 | 9/1977 | Hanslik | 366/85 |
| 4,188,128 | 2/1980 | Betancourt | 366/72 |

Primary Examiner—Robert W. Jenkins
Attorney, Agent, or Firm—Schwartz, Jeffery, Schwaab, Mack, Blumenthal & Evans

[57] ABSTRACT

A roller-mill for mixing and plasticizing materials, comprises two tempered, rotatable rollers which are operable at different circumferential speeds. The rolls are long and are provided with angular grooves which are inclinedly disposed relative to the axis of rotation of the rolls. The grooves on the two rolls extend in opposite directions to one another. The grooves producing biaxial shearing in the nip between the rolls because material is reliably fed into the nip. The grooves also produce a simultaneous, axial conveying of the material. Along the roll nip, various materials which are to be mixed can feed-in simultaneously or successively and, depending upon the intended purpose of the end product, the materials are removed from the device for further processing in either a partially plasticized state or in a fully homogenized state, as desired.

10 Claims, 13 Drawing Figures

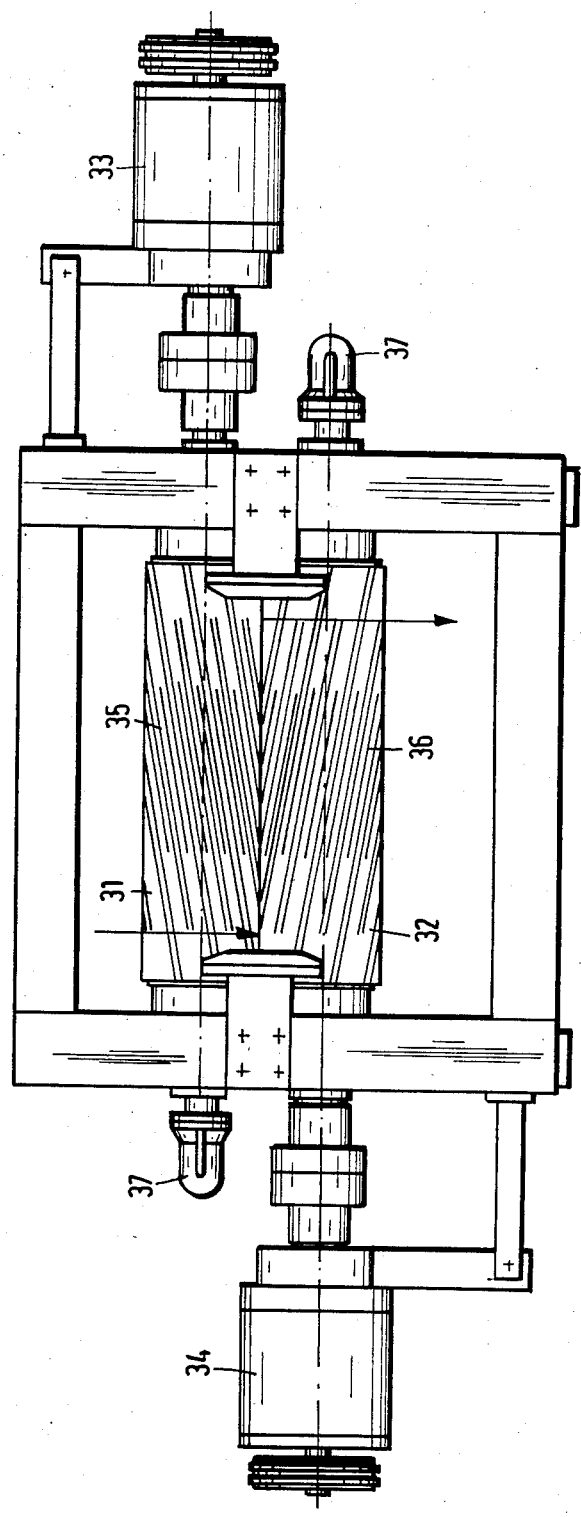

MIXING AND SHEARING ROLLER-MILL

FIELD OF THE INVENTION

The present invention relates to a roller-mill for continuously conveying, mixing, homogenising and plasticising rubber, plastics and other plasticisable materials in the shearing nip between two tempered rollers.

BACKGROUND OF THE INVENTION AND DISCUSSION OF PRIOR ART

Known roller-mills in which the rolls have smooth external surfaces do not mix and plasticise the material in the roll nip satisfactorily because such mixing and plasticising is not effected uniformly. If relatively high adhesion forces are produced between relatively hot portions of the material being processed and the roll surface, these hot portions of material are sharply drawn into the roll nip and are hard-sheared. In such a case, very high, but localised, temperatures are produced in the material whilst, in axially adjacent regions, colder portions of the material remain in front of the roll nip for an uncontrollably long time. This is because there is too little external frictional adhesion of the material with the roll surfaces to permit them to enter the roll nip.

These particles of materials are often referred to as "cold tongues" or "cold projections" and have often only cooled in their surface regions. Internally, however, the particles may well have been thermally decomposed because of their long dwell time in a heated region before they are drawn into the roll nip.

OBJECTS OF THE INVENTION

The present invention seeks to provide a device by means of which the material may be fed into the device in a controllable, reliable and uniform manner and which also permits the feeding of awkwardly-shaped and rough pieces of material into the roll nip. The invention also seeks to provide a device by means of which a very brief overall dwell time for the material is achieved with a controllable advancing degree of plasticisation whilst the material is being axially conveyed in an advantageous manner.

BRIEF SUMMARY OF THE INVENTION

According to the present invention, there is provided a mixing and shearing roller-mill for plasticisable material comprising first and second rotatable, tempered rolls, each said roll defining a longitudinal axis, said rotation being effected about said longitudinal axis, drive means for each said roll for rotating said rolls at different speeds relative to one another, each said roll having an axial length and a diameter, said axial length being at least four times greater than said diameter, each said roll including an external surface, said external surface defining grooved portions, the transition regions between said surface and each said groove being sharp-edged, each said groove being inclinedly disposed at an acute angle relative to said roll axis, said grooves on said first roll having an opposite hand to said grooves on said second roll, each said roll defining first and second axial end regions and a central region intermediate said end regions, said material feed means disposed in said first end region and material discharge means disposed in said second end region, the number and depth of said grooves increasing from said first end region to said central region and decreasing from said central region to said second end region, said rolls jointly defining a roll nip therebetween and adjustable feed and discharge means for feeding and discharging different types of material and additives axially disposed along said roll nip.

By ensuring that the upper edges of the grooves are angular or sharp, the material located in front of the roll nip is subjected to a saw-like action and is chopped into pieces in the manner of two helical, counter-rotating roller-mills. The material is thus forcibly pulled into the roll nip, irrespective of any incidental adhesion between roll surface and the material.

In the roll nip, the central layer of the material undergoes very intensive, biaxial shearing. The different surface speeds of the roll between which the material is trapped whilst located in the grooves of the two rolls necessarily cause different portions of the material to shear against one another in the nip, such shearing simultaneously being both radial and axial.

Because of the configuration of the device according to the present invention, wherein the roll surfaces are grooved, portions of normal roll surface are located between the grooves. The radial shearing nip width is thus constantly changing in the narrowest portion of the roll nip. Because of the different surface speeds of the two rolls, the shearing intensity varies within large amplitudes due to the change in layer thickness.

If, during operation, a smooth roll segment faces a similar smooth segment of the other roll across the roll nip, the layer thickness of the material located therebetween may, for example, be 1 mm. If, however, a smooth segment of one roll faces a groove on the other roll having a depth of, for example, 1.5 mm, the layer of material will have a thickness of 1 mm plus 1.5 mm, that is to say 2.5 mm, in one localised region. Obviously, if two grooves face one another, a layer thickness of material of 1.5 mm plus 1 mm plus 1.5 mm, that is to say 4 mm, is produced.

In practial embodiments of a roller-mill according to the present invention, the grooves were from 0.5 mm to 10 mm deep, preferably from 1 mm to 5 mm deep, and were from 1 mm to 50 mm wide, preferably 1 mm to 10 mm wide. However, the grooves preferably extend angularly relative to the axis of roll. The groove bases are, desirably, semi-circular or rectangular with rounded edges in shape. Whilst a person skilled in the art would normally expect the material to adhere to, or sinter in, the base of the groove, exactly the opposite occurs utilising a roller surface which is grooved in accordance with the present invention. The groove base is, effectively, rinsed clean by strong material vortices. A gas, usually air, cushion accumulates in the base of the groove. As the rolls rotate and the roll nip is constantly increasing and decreasing in size, effective degassing occurs and causes the formation of the air cushion.

This air cushion slightly lifts rolled material which has been forced in the groove from the base of the groove base. This expands during operation of the roller-mill with an audible click.

By providing the rolls with grooves, the material is reliably fed into the roll nip. Even if non-homogeneous material is fed into the roll nip, large volumes of such material are simultaneously mixed in the nip, even at relatively high temperatures, so that the material is neither burned nor clinkered onto the roll surfaces.

In addition, it is advantageous if cold fresh material or powder is supplied to the roller-mill in those regions of the mill where an intense shearing heat is produced. Such cold material or powder being surrounded by semi-plastic material is gently decomposed very rapidly. At the same time, any excess shearing heat produced is profitably used for plasticising the fresh material.

The overall energy consumption per kilogram of plasticised material is therefore extremely low and the roller-mill according to the present invention can be used for treating numerous different types of material having greatly differing viscosities.

A further requirement for achieving the object of the invention, that is to say, for producing biaxial shearing, is the control of the axial flow of material so that the plastic material has a very brief, but uniform, dwell time in the region of the roll nip so that both its own properties and the roll surface in the immediate vicinity thereof are not adversely affected.

In a subsidiary aspect of the present invention the grooves formed in the roll surfaces have opposite inclinations or pitches. The angle which the grooves subtend with the axis of the rolls is between 1° to 45°, preferably 5° to 35°. However the most advantageous angle depends on a number of factors. Thus, it depends upon the roll diameter, the basic roll nip, the spacing between the grooves and the difference in the speed of rotation of the two rolls. With relatively small roll diameters of from 100 mm to 200 mm, a groove spacing of from 10 mm to 50 mm and an angle of inclination of from 7° to 30° provide good results both for the axial conveyance of material and for the axial shearing. With roll diameters of from 400 mm to 650 mm, successful operations have been carried out using angles of inclination of from 5° to 25° and with groove spacings of from 6 mm to 25 mm.

In dependence upon the material to be plasticised, a desirable facet of the invention provides that the number of grooves, that is to say, the inter-groove spacing and their depth are not identical over the entire axial length of the rolls. This is dependent upon the desired material flow rate and the viscosity of the material. Thus, for example, the feed end of the roller-mill may have a relatively small number of relatively shallow grooves so as to lengthen the dwell time of the relatively cold material. In the region of the rubber elasticity, the mixing and degassing effect produced is increased by using deeper grooves and twice or three times the number of grooves. This prevents shearing burning.

In the final section of the mill, immediately prior to the discharge of the material, fine decomposition is achieved because the material is now semi-plastic. Such decomposition is controlled by using fewer, shallower grooves.

The interior of the rolls are, preferably, heatable and coolable. To adjust the roller-mill for the plasticising process, a temperature is initially set for the two rollers, the basic roll nip is selected and then the friction set up between the two rolls is adjusted by adjusting the rotational speeds of the rolls.

Since the material fed into the mill is continuously axially conveyed and plasticised, strips of material which have been partially plasticised to a desired extent can be removed from the mill by suitably selecting the location of the discharge point along the roll axis.

The plasticising process is freely accessible from externally. In consequence, it is advantageous, according to the invention, to supply fresh material(s) to one or more pre-determined locations along the longitudinal axis, and such fresh material may be partially plasticised in a controlled manner utilising the mill according to the present invention. Thus, impact resistant modifiers, fillers, dyestuffs, cross-linking components, foaming agents or even reinforcing fibres can be fed into the mill at pre-determined axial locations so as to ensure that they are only added when material is in a desired plasticised state. Alternatively, a defined dwell period is selected by adding the material at a pre-determined location along the roll nip. Axially adjustable feeding devices may be used for this purpose.

From measurements taken from test roller-mills according to the present invention, it has been found that comparatively low nip pressures of from 30% to 40% of those existing in conventional roller-mills can be used, which permits the rolls to have a considerable structural length. Even a roll length of two- to three-times the length of conventional rolls used hitherto does not present any structural problems. The desideratum of intervening in the operational method from externally is also possible. It should also be mentioned that the plasticising process may be carried out in an inert gas atmosphere in a single casing or housing.

It does not need to be specifically mentioned that the known advantages of roller-mills, such as moderate costs, reliable operation, robustness, little wear damage, easy cleaning during colour or dye change and universal utilisation also apply to the device according to the present invention.

Using a continuously charged shearing rolling-mill, problems which had not been satisfactorily solved hitherto also arose in the present case, particularly with highly viscous sticky materials, and with powdery substances.

Accordingly, in an advantageous embodiment of the present invention, devices for forcibly feeding the shearing nip are disposed at the feed end of the shearing roller-mill.

In the case of powdery substances and for materials ranging from relatively fluid pastes to highly viscous materials, a speed-regulated geared pump is provided, by means of which the substance is pressed into the grooves in the rolls and thus fed into the homogenising process.

According to one subsidiary aspect of the invention, very tough to highly-viscous materials, for example rubber spheres, are pressed against the sharp-edges of the grooves in the shearing roller-mill by means of sprocket chain advancing means, toothed roll advancing means or by means of a feed chute provided with a piston ram.

BRIEF DESCRIPTION OF THE DRAWINGS

The invention will be further described, by way of example, with reference to the accompanying drawings, in which:

FIG. 3 is a plan view of a roller-mill in accordance with the present invention;

DESCRIPTION OF PREFERRED EMBODIMENTS

Figure 1A:
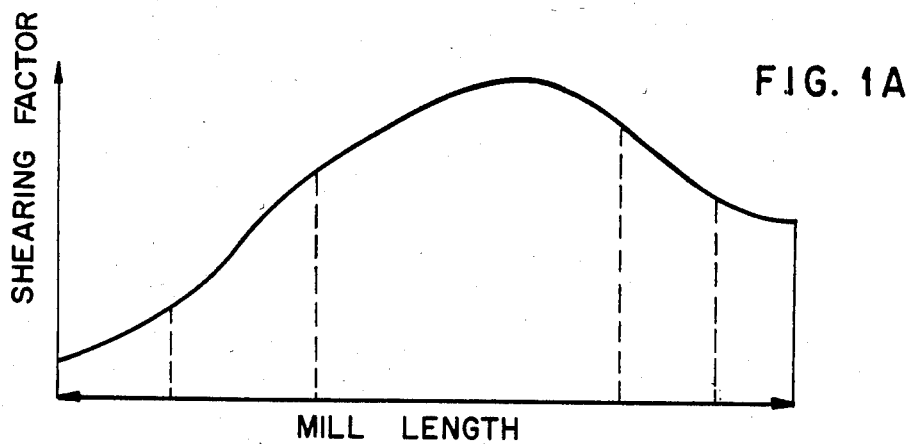
FIG. 1A is a graph which shows how the shearing factor occurring in the mill varies along the length of the mill.
Figure 1B:
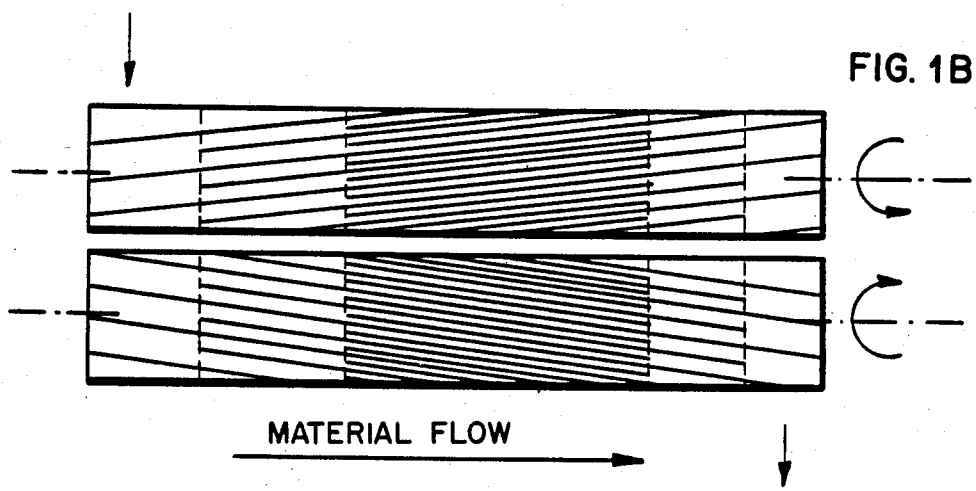
FIG. 1B is a plan view of two rolls forming part of a roller-mill according to the present invention.

One embodiment of a continuous mixing and shearing roller-mill in accordance with the present invention is schematically shown in FIG. 3. The mill comprises two rolls 31, 32 which each have a diameter of 150 mm and a barrel length of 750 mm.

One roll 31 is driven by a motor 33 in a first direction and the other roll 32 is driven in the opposite direction by a second motor 34. The rotational speeds of the two rolls 31 and 32 are adjustable independently of one another but both speeds generally lie in the range of from 5 r.p.m. to 50 r.p.m. On its external surface, each roll is provided with a helically extending groove profile or configuration 35 and 36 respectively. These profiles 35 and 36 each subtend an angle of substantially 10° with the longitudinal axis of the roll on which it is formed. The grooves in the two rolls 31 and 32 extend in opposite directions to one another.

Each groove is of varying depth and, in use, the material to be treated is caused to enter the mill at a first axial end region and is discharged from the other axial end region. In the feed region, the groove depth is 0.75 mm. This increases to a depth of 2.5 mm in the central region of the roll and diminishes to 0.5 mm in the discharge end region. The groove width is constant at 3 mm, this value having been selected for ease of manufacture.

In the central region of the roll, the spacing between adjacent grooves is at a minimum. This central region extends over 40% of the barrel length. In the embodiment shown in FIG. 3, thirty-six grooves are distributed over the periphery of each roll in the central region. This central region extends towards each axial end of the roll for a distance of 150 mm so that the axial length of the central region is 300 mm. Adjacent this central region, and extending towards each axial end region, is a further region having an axial length of 125 mm. Such region has eighteen grooves distributed over the periphery of the roll with a spacing of 26 mm between the grooves. For a length of 100 mm in each end region, nine grooves are distributed over the periphery of the roll, the groove spacings being 52 mm. The large number of grooves in the central region of the roll, necessitated by the method, reduces the nip pressure in the centre of the roll to such an extent that, instead of using a roll barrel length of 750 mm for many materials, a barrel length of 1500 mm with a diameter of 150 mm can be utilised.

In order to plasticise hard polyvinyl chloride, hereinafter referred to as PVC, one roll was internally tempered with fluid at 180° C. and the other roll was internally tempered with fluid at 160° C. through supply members 37 which are mounted on the axis of the rolls but do not rotate therewith.

Figure 2:
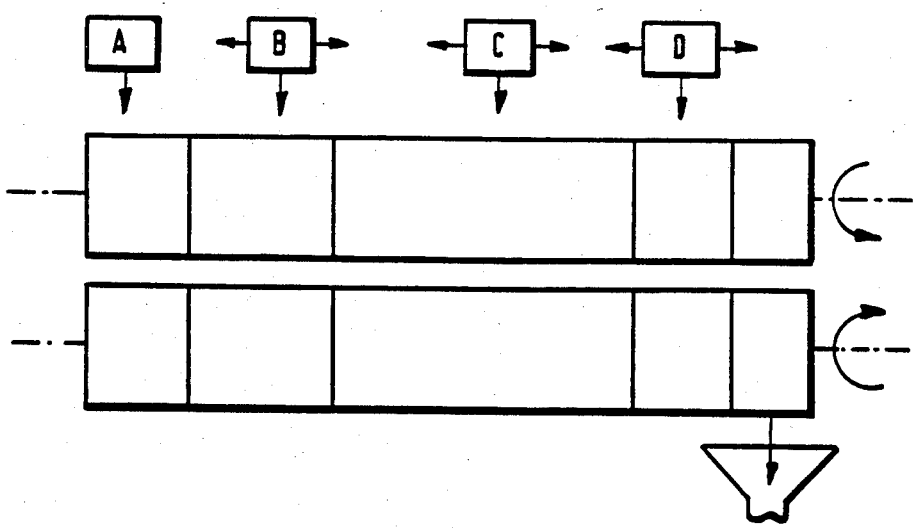
FIG. 2 shows, schematically, how four feed locations for different materials can be disposed along the length of the roller-mill shown in FIG. 1.

An example will now be given of the operation of the roller-mill according to the present invention. It will be assumed that the mixture to be treated comprises four components A, B, C and D. Reference should now be made to FIG. 2. In this example, component A is an acetate-containing PVC-copolymer which has a relatively low melting point. Component B is a high-molecular weight PVC powder, component C is a filler material possibly including pigments and component D is an impact-resistant material or a glass fibre pulp. These individual components are, it will be observed from FIG. 2, supplied at axially differing locations to the roll nip by means of metering devices. The homogenised material is removed from the roller-mill by scraper devices. As soon as the material has been plasticised and homogenised to the desired extent, the material is dropped into the feed device of a shaping machine for further treatment. Such machine may be a shaping extruder, an injection-moulding machine or a film calendar.

Such a roller-mill in accordance with the present invention, is suitable for plasticising hard PVC and it is possible to obtain an output which is two- to three-times that obtained using a conventional roller-mill. It is obviously advantageous to be able to supply the individual components successively to the roller-mill because this permits the obtention of material combinations which improve the properties of the end product. Thus, for example, it is possible to ensure that there is a controlled inhomogeneity in the fine structure of the material. In the case of impact-resistant components, full shearing decomposition, which is the most feared disadvantage when using known devices, is reliably prevented. Moreover, powdered rubber compositions can be homogenised and masticated in one operation.

According to a preferred embodiment of the present invention, the rolls which rotate in opposite directions to one another are provided with groove profiles which are of opposite pitches to one another. Thus, one roll has a right-hand thread or pitch and the other roll has a left-hand thread or pitch. The shape or configuration of the groove profile is seleted in dependence upon the properties of the material to be mixed and/or plasticised.

Figure 5B:
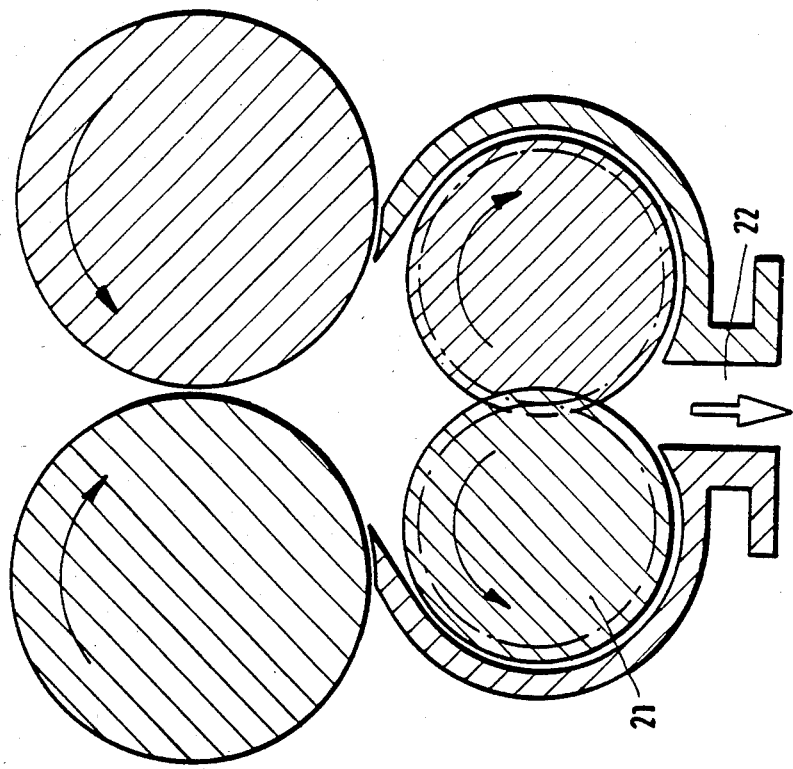
FIG. 5B is a cross-sectional view showing the toothed wheels of FIG. 5A.
Figure 5A:
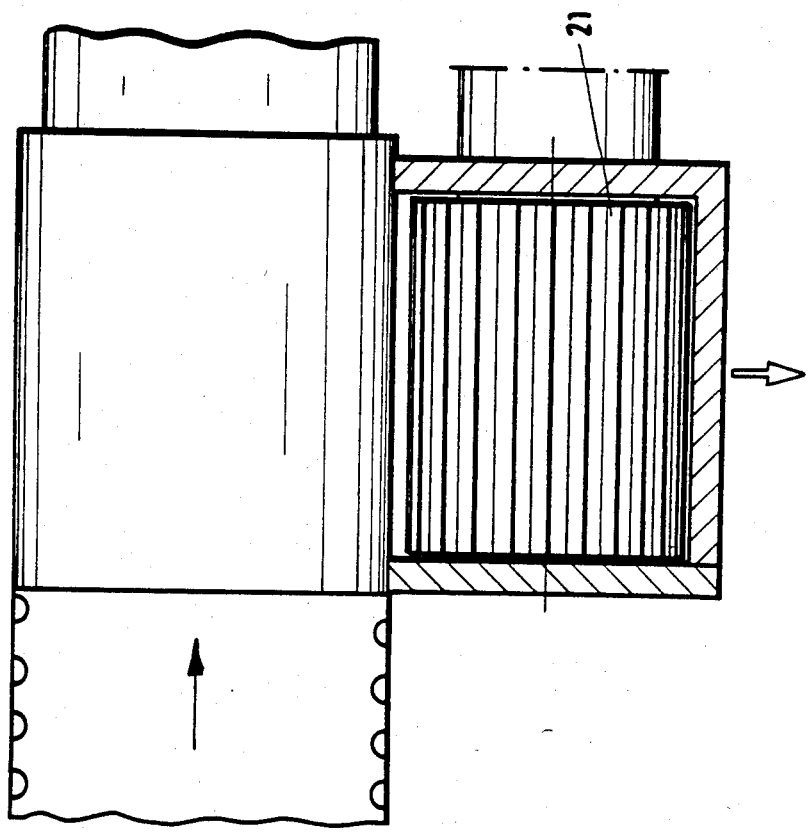
FIG. 5A is a longitudinal sectional view of a pair of toothed wheels disposed beneath the discharge end of a roller-mill.

In the case of powdery substances and/or if the material has a viscosity which lies in the range of a relatively fluid paste to highly viscous, a speed-regulated geared pump is provided, as is shown in FIGS. 5A and 5B. The substance or material is pressed into the grooves in the rolls by means of the pump and can then be homogenised.

If the material is very highly viscous, for example rubber spheres, the grooves in the shearing rolls are made sharp-edged. The material is then pressed against the sharp edges of the grooves by sprocket chain or toothed roll advancing means or by a feed chute together having a pressure ram incorporated therein.

These angular grooves in the rolls cut small material strips from the rubber or rubber-like material in a manner similar to two-roll milling tools and conduct such strips continuously to the shearing nip.

Experience with shearing roller-mills has shown that the shearing rolls may also be used, if desired, to combine and extrude processed material. In such a case, however, the construction of the device of the present invention for extruding the material depends on the nature and viscosity of the material.

Figure 4A:
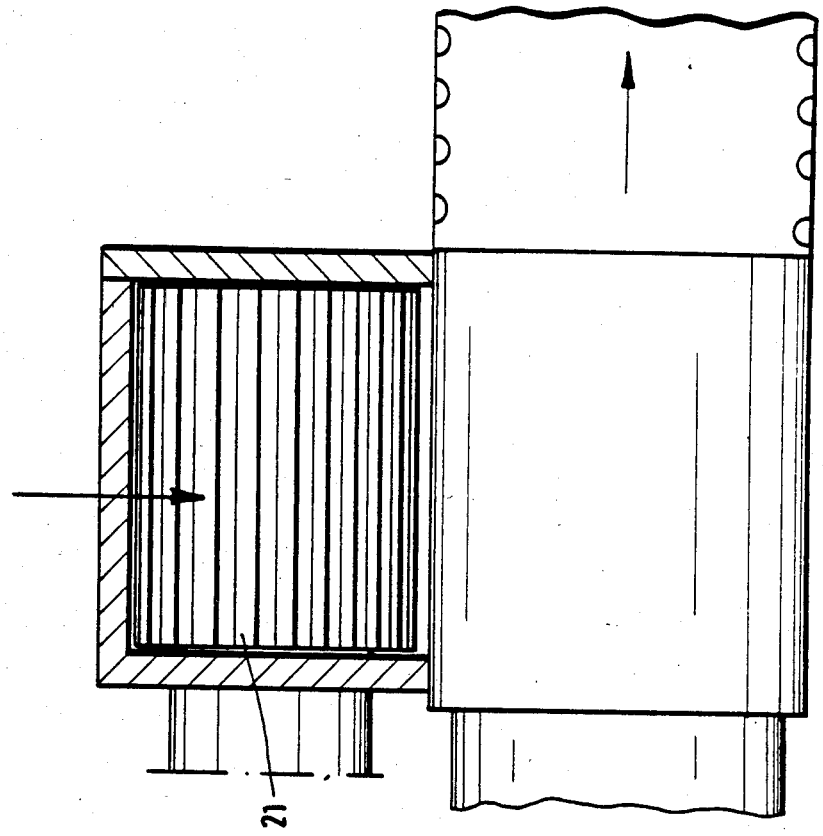
FIG. 4A is a longitudinal sectional view of an alternative embodiment in which a speed-regulated geared pump is disposed above the roller-mill at the feed end of the mill.
Figure 4B:
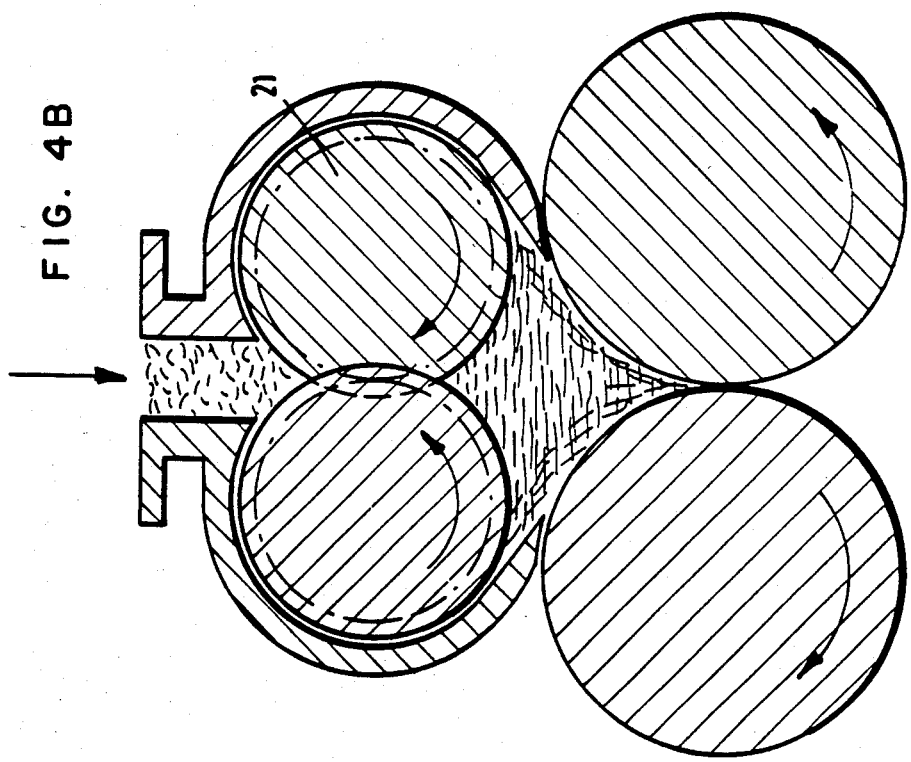
FIG. 4B is a cross-sectional view of the embodiment of FIG. 4A.

In one arrangement, the material is not removed using a conventional scraper. Instead, a pair of toothed wheels 21 forming part of a geared pump are utilised which wheels are located in the discharge region of the rolls. In such an arrangement, the grooved profile of the rolls are not inclined in the discharge region, as can be seen in FIG. 4a.

The toothed wheels may be connected to the rolls or may be driven and controlled independently of one another. The material is received between the teeth of the wheels and is conducted, for subsequent pressure extrusion, to a mouthpiece or nozzle provided at the pressure and discharge end of the geared pump 22. This arrangement, which is shown in FIGS. 5a and 5b, is particularly advantageous if very viscous, stickly materials are being treated. The provision of separate drive means for the toothed wheels means that the extrusion and discharge device is a separate entity which can be easily attached to and removed from the roller-mill and can therefore be readily replaced. It does not, therefore, interfere with the actual roll system.

Figure 6:
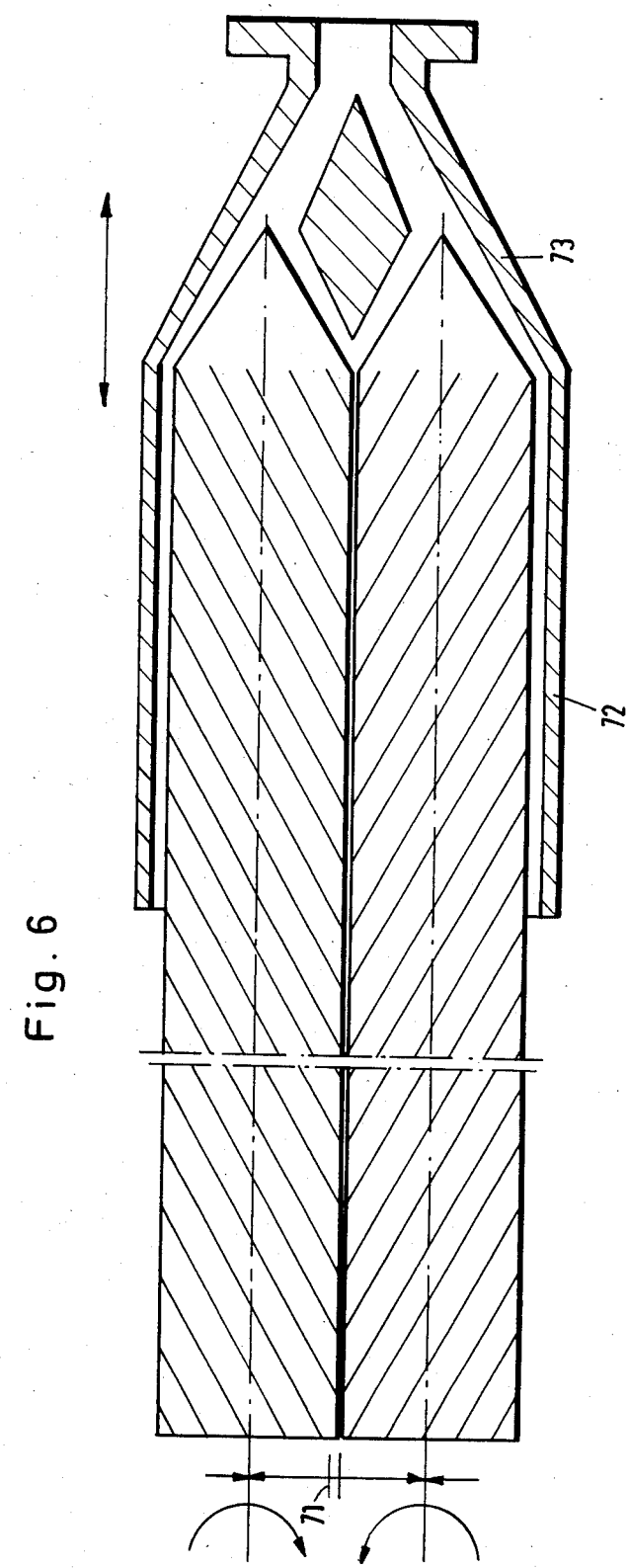
FIG. 6 shows the arrangement of a bearing housing above the feed end of a roller-mill according to the present invention.

The following modifications of the shearing roll system are generally utilisable if the material being treated has an average viscosity, such as rubber and most thermoplastics materials. In such modifications, the shearing rolls define an open shearing nip at the feed end of the device, this being due to the provision of two conventional, bearing housings 71 shown in FIG. 6. The shearing rolls are, however, continuously profiled with grooves at their discharge end and are mounted in a bearing housing 72, 73 in the manner similar to that a twin-screw barrel extruder.

The barrel casing has a conically inwardly tapering discharge aperture formed therein. This casing is axially slipped over substantially the discharge end of the rolls and covers the region in which the plasticising process is completed. The casing causes rheological conditions to be produced in this region, which condition is similar to that existing in non-meshing, friction-driven twin-screw systems wherein the screws are driven in opposite directions.

For this reason, the ends of the rolls are provided with continuous grooves which acts as screw threads. The threads terminate in the housing in conically tapering tip portions.

The shearing nip between the two rolls increases in size in a direction toward, and as far as, the tapered tip portions. However, because the surface profile of the shearing rolls is completely different, the build-up of pressure in the plastic material and the support of the shearing nip pressure against the barrel walls are much more intensive. This is technically more advantageous than is the case in conventional, known twin-screw systems. However, the advantages of the open shearing roll system for the processing method and the twin-screw principle for the shaping process are not lost.

Figure 7A:
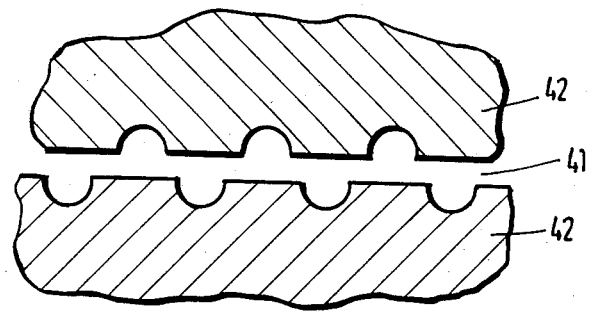
FIG. 7a is a schematic view of an internal shearing nip.
Figure 7B:
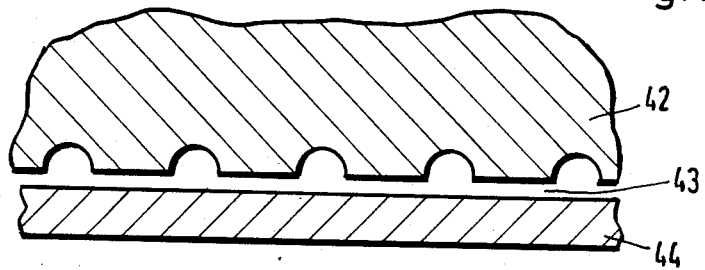
FIG. 7b shows a shearing nip configuration formed between a shearing roll having a profile and a housing wall.

FIG. 7a is a schematic view of the internal shearing nip 41 formed between the profile 42 of the two shearing rolls which are frictionally operated. FIG. 7b shows the nip configuration 43 formed between a shearing roll having a profile 42 and the housing wall 44.

Figure 8:
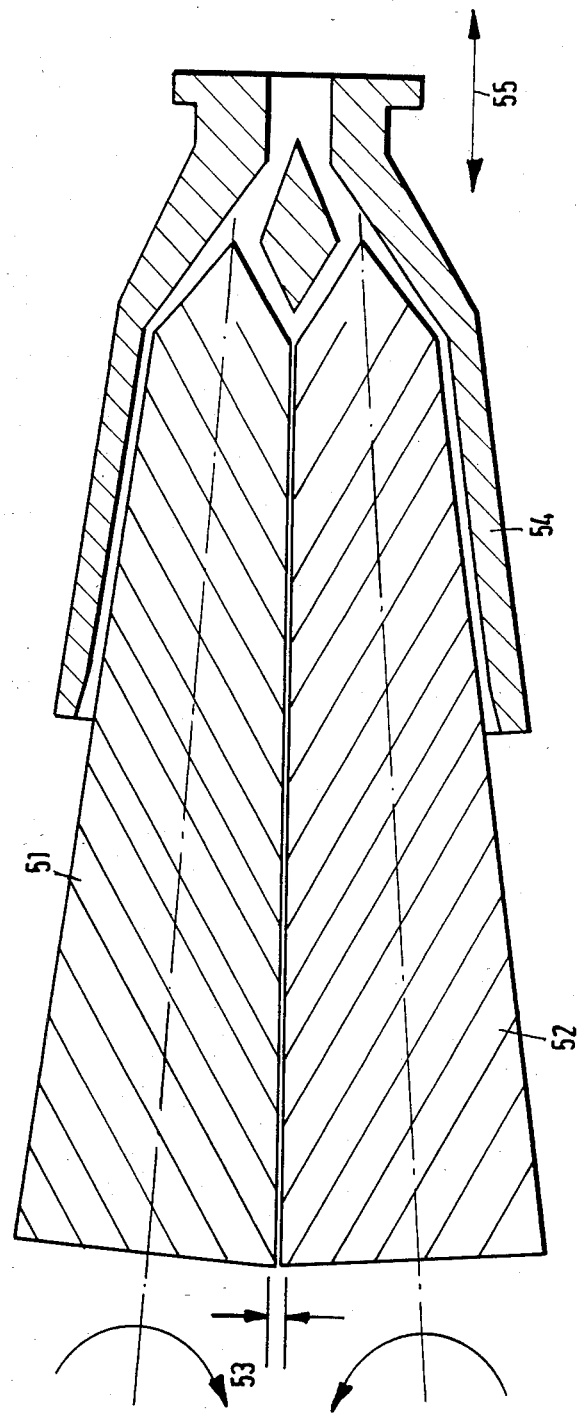
FIG. 8 shows a conically tapering arrangement for the rolls, the mounting and nip adjustment being provided by a conically tapering casing or cover member for the barrel.

The embodiment shown in FIG. 8 also shows conically inwardly-tapering, grooved shearing rolls 51 and 52. At the material feed end, these rolls have a conventional, adjustable shearing nip 53 formed therebetween. The mounting and the nip adjustment for the conically tapering rolls at the discharge end are provided by a suitably tapering cover or casing member 54 for the barrel. For precise setting, this cover member 54 is axially displaced in one of the directions of arrow 55, the narrower nip being towards the feed end of the device and the larger shearing nip extending away from such end.

Figure 9:
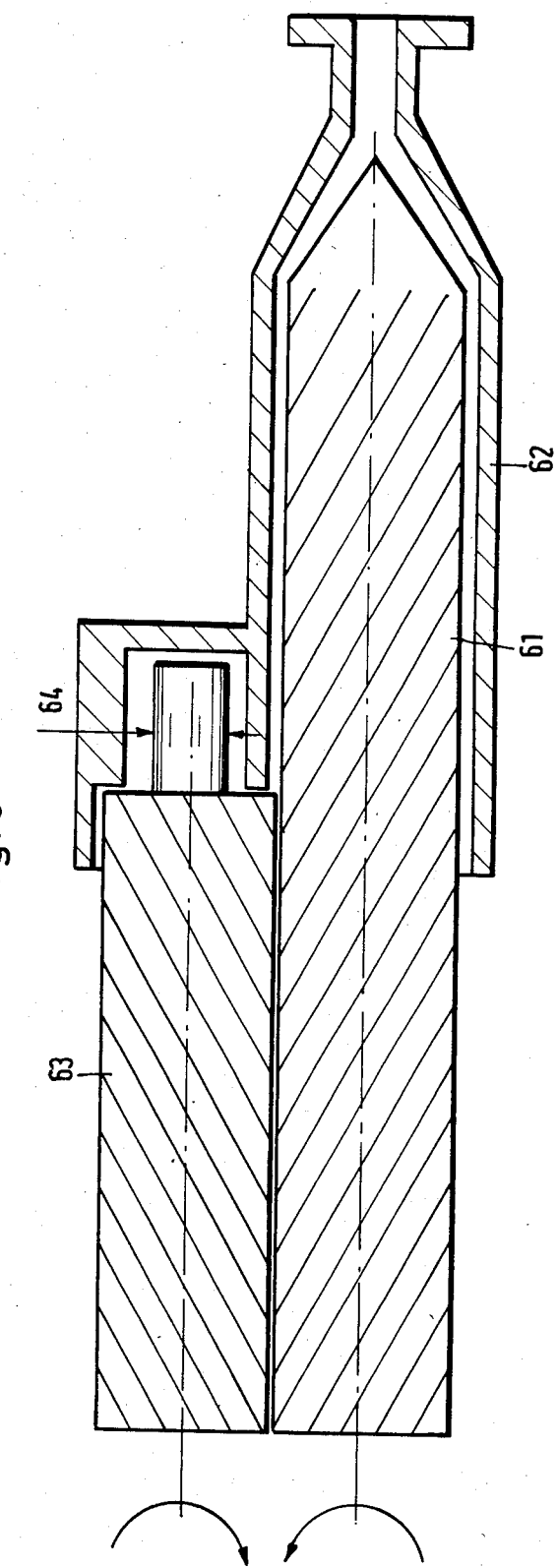
FIG. 9 shows a further embodiment, in which only one of the rolls is axially extended and is in the form of a discharging and extruding screw.

In a further alternative embodiment of the invention, shown in FIG. 9, only one of the two shearing rolls has an axially extended portion. Such roll, in the form of a discharge and extrusion screw, is surrounded by a suitable barrel casing 62 of a single screw system which is advantageous in flow technology. The other, counter-setting roll 63 includes a separate setting mechanism 64, as in the case of the embodiment shown in previous Figs, and also permits, therefore, the control of the rear shearing nip from externally.

One feature common to all of these extrusion devices which are arranged in series in the processing method is that they all require the material flow to be carefully controlled. Feed means are advantageous in all cases, such as, for example, pouches or pockets of material at the inlet end of the barrel casing. The problem of material flow, which generally arises with twin-screw systems, is only of reduced significance in the present invention, as in the case of nonmeshing twin roll arrangements. The other method of building-up pressure via the shearing nip and the grooved roll system can produce constant over-feed without causing problems, whereby the overflow material can accumulate on the rolls. The open roll portion then forms a heat-retaining pad for the material, prior to its being fed into the extrusion portion. Even if there is an overflow of material in the shearing roll system, the excess material drops into a collecting tank and can be recycled from the tank without damage. Altogether, the system proves to be robust and operationally reliable. The described additional devices for the feeding process permit the shearing roll system to be intrinsically associated with the actual development course of the method.

I claim:

1. A mixing and shearing roller-mill for plasticisable material comprising first and second rotatable, tempered rolls, each said roll defining a longitudinal axis, said rotation being effected about said longitudinal axis, drive means for each said roll for rotating said rolls at different speeds relative to one another, each said roll having an axial length and a diameter, said axial length being at least four times greater than said diameter, each said roll including an external surface, said external surface defining grooved portions, the transition regions between said surface and each said groove being sharp-edged, each said groove being inclinedly disposed at an acute angle relative to said roll axis, said grooves on said first roll having an opposite hand to said grooves on said second roll, each said roll defining first and second axial end regions and a central region intermediate said end regions, said material feed means disposed in said first end region and material discharge means disposed in said second end region, the number and depth of said grooves increasing from said first end region to said central region and decreasing from said central region to said second end region, said rolls jointly defining a roll nip therebetween and adjustable feed and discharge means for feeding and discharging different types of material and additives axially disposed along said roll nip.

2. A roller-mill as recited in claim 1, in which the grooves which extend inclinedly relative to the roll axes at an angle of from 5° to 45°.

3. A roller-mill as recited in claim 1 wherein said grooves extend angularly relative to said external surface of said roll, each said groove having a cross-section selected from the group consisting of semi-circular, U-shaped and part-rectangular with rounded corners.

4. A roller-mill as recited in claim 1 wherein at said feed end and at said discharge end, said grooves are 0.5 mm to 10 mm deep, 1 mm to 50 mm wide and are spaced from 5 mm to 100 mm apart from one another.

5. A roller-mill as recited in claim 1 wherein said adjustable feed means for feeding said materials to be mixed and plasticised are axially adjusted so that said materials are successively introduced into said roll nip in a pre-determined plasticised state, said materials also being discharged in a pre-determined plasticised state by means of said axially displaceable discharging devices, said material then being fed to a feed hopper of a subsequent treatment device.

6. A roller-mill as recited in claim 1 wherein means are provided for said forcibly pressing said material into said grooves, said means being selected from the group consisting of geared or toothed-wheel pumps, sprocket chain feed means and piston rams.

7. A roller-mill as recited in claim 6, wherein said device additionally includes speed-regulated geared pump means coupled to said discharge means for discharging processed material and nozzle means for extruding said discharged material.

8. A roller-mill as recited in claim 6, wherein said discharge ends of said roll each include a continuous groove profile, each said roll terminating in conically inwardly-tapering tip means, said device further including casing means disposed around said discharge end region of each said roll and acting as an extrusion and pressure element.

9. A roller-mill as recited in claim 6, wherein said rolls are profiled from said first end to said material discharge point and are conically inwardly-tapered, said device further including casing means shaped so as to correspond to the conicity of said rolls disposed around said discharge end region of said rolls.

10. A roller-mill as recited in claim 7 wherein said rolls are of differing axial lengths, the longer of said rolls being provided with a continuous groove profile, said device further including casing means receiving said longer roll.

* * * * *